United States Patent [19]

Friedman

[11] 4,328,864

[45] May 11, 1982

[54] METHODS FOR RECOVERY OF OIL

[75] Inventor: Robert H. Friedman, Houston, Tex.

[73] Assignee: Getty Oil Company, Houston, Tex.

[21] Appl. No.: 208,694

[22] Filed: Nov. 20, 1980

[51] Int. Cl.³ .................. E21B 33/138; E21B 43/22
[52] U.S. Cl. .................................... 166/274; 166/295
[58] Field of Search ............. 166/273, 274, 294, 295, 166/281, 282, 283

[56] References Cited

U.S. PATENT DOCUMENTS

| | | | |
|---|---|---|---|
| 3,181,612 | 5/1965 | West et al. | 166/295 X |
| 3,302,717 | 2/1967 | West et al. | 166/295 X |
| 3,336,979 | 8/1967 | Ingraham et al. | 166/295 X |
| 3,353,601 | 11/1967 | Dollarhide et al. | 166/295 X |
| 3,749,174 | 7/1973 | Friedman et al. | 166/294 |
| 3,811,508 | 5/1974 | Friedman | 166/294 |
| 3,841,401 | 10/1974 | Restaino et al. | 166/273 X |
| 3,865,189 | 2/1975 | Friedman | 166/294 |
| 3,866,684 | 2/1975 | Friedman | 166/294 |
| 3,866,685 | 2/1975 | Friedman | 166/294 |
| 4,276,935 | 7/1981 | Hessert et al. | 166/294 X |

*Primary Examiner*—Stephen J. Novosad
*Attorney, Agent, or Firm*—Arnold, White & Durkee

[57] ABSTRACT

Methods for the recovery of oil are provided, which include selectively plugging the water-rich portions of an oil-producing formation by injecting into the formation a swelling polymer.

17 Claims, No Drawings

METHODS FOR RECOVERY OF OIL

BACKGROUND OF THE INVENTION

This invention relates to the recovery of oil from subterranean formations.

In the drilling and production of fluid mineral deposits such as petroleum oil and gas from subterranean reservoirs, the presence of water (usually in the form of an aqueous brine solution) has been a continuing problem. In almost every subterranean formation wherein either petroleum oil or gas is present in quantities which make production practical, water is also found to be present. Usually, certain portions or strata of an oil-bearing formation may be considered oil-rich, and other portions or strata of the formation may be considered water-rich.

Production of connate water along with oil or gas from a producing formation is not desired for many reasons, among them being the extra production expenses encountered, the necessity for separation of the oil and water following production, and the fact that means must be provided for getting rid of undesired brackish water which is a pollutant to the surrounding terrain.

The problem is especially critical in those instances wherein a post-primary recovery process is employed which utilizes a liquid flooding medium such as water (i.e., a waterflood operation) that is injected into the formation, as through an injection well. By the very nature of such processes, a relatively large amount of injected water will be produced at the producing well or wells. The focus of the problem in such situations thus shifts to that of producing enough oil along with the water (connate and injected) to make the process economical, and the recovery of available oil from the formation.

The problem as set forth above and the many disadvantages encountered have been recognized by the oil and gas production industry for many years. Many efforts have been made to solve the problem in whole or in part to yield production at a more favorable oil-to-water production ratio and to provide for more complete recovery of available oil in subsequent water-flooding processes.

One prior art attempt at solution of the problem has been to use various solvents to selectively or preferentially plug water-rich portions.

Applicant himself has proposed various solutions. See, for example, Applicant's prior U.S. Pat. Nos. 3,749,174 issued July 31, 1973; 3,811,508 issued May 21, 1974; 3,865,189, issued Feb. 11, 1975; 3,866,684, issued Feb. 18, 1975; and 3,866,685 also issued Feb. 18, 1975.

Another approach taken by the prior art has been that of West, U.S. Pat. No. 3,181,612, wherein a polymer which swells on contact with water is injected into the well. There, however, a polyurethane polymer is utilized which swells only to about 10 times or so in volume compared to its dry volume. The polyurethane polymer of West is prepared in an oil-base solution for injection.

Many of the prior art methods have been at least partially successful, and have afforded at least partial solution to the problem in certain instances and under certain well conditions. Nevertheless, the problem mentioned above still plagues the industry and remains critical. Indeed, with the rapid increase in production costs and the enforcement of pollution regulations by various governmental agencies, the industry is in very great need for a practical and inexpensive solution to this long-felt problem.

One of the primary difficulties with the prior art solutions is their impracticality for use in most situations because of the expense involved. It must be remembered in connection with the methods of this type that, typically, huge volumes of materials must be injected into the formations. Since the oil or gas which is produced is of limited value to begin with, and since production expenses are already high, any material injected into the well for selective plugging or for any other reason must, to be at all practical, be quite inexpensive. Most of the methods of the prior art known to applicant entail the use of materials which are much too expensive to use in large volumes, in the typical situation encountered by the driller or operator.

Many other less serious problems have been found to exist with the various prior art proposals. For example, in some instances exceedingly large pump pressures have been found necessary to inject the solutions proposed. In other instances the solutions have gelled or set up prematurely before reaching the areas of primary concern thus leaving some areas completely unplugged. In still other instances it has proven impractical or too expensive to heat the well to the extent desired by some of the proposed solutions. In other cases, it has been found that the methods were not satisfactory for use under typical well conditions of salinity and/or temperature.

Further, operators are generally skeptical about injecting foreign matter which might have an adverse effect on the wells and even irreparably damage them.

It would be desirable if convenient and inexpensive methods for the recovery of oil utilizing selective plugging could be provided, wherein some of the more prevalent problems of the prior art could be eliminated.

The present invention provides such methods.

SUMMARY OF THE INVENTION

This invention provides methods for the recovery of oil from subterranean formations which have portions that are relatively water-rich and other portions which are relatively oil-rich. The methods of the invention are useful in salt water situations although high salinity does adversely affect the efficacy of the invention downhole.

In accordance with the invention, methods are provided which include providing a swelling polymer that is capable of absorbing up to about 1300 times its weight in water. An unswollen suspension of the swelling polymer is prepared, and the unswollen suspension is injected into a subterranean formation having some portions which are relatively water-rich and other portions which are relatively oil-rich. When the suspension encounters water in the pores of rocks in the water-rich portions of the formation, immediate swelling occurs. The swelling of the polymer plugs the pores and thus prevents the passage of liquids therethrough.

No such plugging occurs in the relatively oil-rich portions of the formation.

Thereafter, oil may be pushed through the formation by use of a liquid flooding medium such as by water-flooding, whereby the flooding medium selectively flows through the oilrich, as opposed to the plugged water-rich, portions of the formation. Oil is then produced through one or more producing wells.

DETAILED DESCRIPTION OF PREFERRED EMBODIMENTS

The invention will be described with reference to particularly preferred embodiments which constitute the best mode known to the inventor at the time of this application.

In accordance with a preferred embodiment of the invention a subterranean formation is selected using customary techniques in the art. The formation selected for use of this invention should be one which has a temperature of about 175° F. or less. The formation should also be one having some portions which are relatively oil-rich and other portions which are relatively rich in water having a salinity of no more than about 7%. That is, the methods of the invention have been found to be most useful, as will be explained below, either in fresh water situations or wherein the salinity of the formation water is in the normal range (most typically 3-5%) of less than about 7%.

The formation selected is also one in which one or more wells are provided. Such wells may be drilled but in many instances will already be in place. Most often, plural wells will be utilized, one or more such wells being utilized as injection wells and one or more of such wells being utilized as producing wells. It may be possible in some contexts of use to utilize a single well as both an injection well and producing well. The use of injection and producing wells is well known in the art, as is the use of waterflooding techniques (or flooding utilizing other liquid media) to push oil from an injection well through the formation toward a producing well.

Further in accordance with the invention, a hydrophilic swelling polymer is provided. By "swelling polymer" is meant not just any polymeric composition which will swell on contact with water. Rather, by "swelling polymer" applicant means a polymeric composition which, upon contact with fresh water, will swell to hundreds of times its normal weight, desirably about 1300 times its normal weight, or more. By "normal weight" is meant the weight of the polymer in its original unswollen state.

One polymer which is suitable for use as the "swelling polymer" of this invention is SGP 502S, which is a copolymer of starch and synthetics (acrylamides and acrylates) manufactured by Henkel Corporation, Minneapolis, Minnesota, U.S.A. The acrylic portion of this copolymer renders it insoluble in water, yet the starch portion imparts high water affinity. Upon contact with fresh water or mildly saline water, this polymer will swell to approximately 1300 times its weight.

Further in accordance with this preferred embodiment of the invention, the swelling polymer is prepared in an injectable unswollen suspension. An injectable unswollen suspension is one which may be readily injected using standard on-site equipment for example at an injection well, and in which the swelling polymer is still in approximately its initial size, i.e., in its unswollen state.

A suitable unswollen suspension can be made by providing a non-aqueous fluid solvent or by providing a highly saline aqueous solution. While many such fluids would be theoretically suitable for such use, large amounts of such fluid will generally be used and therefore cost considerations will dictate the use of the least expensive suitable fluid possibility. One example of such a non-aqueous fluid which is relatively inexpensive at the time of this application is isopropanol. A mixture, for example of isopropanol with some other solvent, may also be desirable.

At the time of this application, a more economical approach appears to be preparing the suspension in highly saline or saturated salt water. While the swelling polymer will swell in salt water of ordinary salinity as is typically found in subterranean formations (about 3-5% NaCl), it will not swell in highly saline (about 25% NaCl) or saturated salt water.

The amount of swelling polymer utilized will depend on cost and other factors, but applicant believes that such a solution comprising less than about 3% by weight of the swelling polymer will be desired in most contexts of use, and about 1% by weight of the swelling polymer will perhaps be preferred. A sufficient amount of the swelling polymer must be utilized in order to achieve the desired amount of plugging.

After the suspension has been prepared, it is injected in its unswollen state into the selected subterranean formation. As the suspension comes into the formation and enters the pores in the water-rich portions thereof (the water in such portions typically being of ordinary salinity, i.e., about 3-5% salt), the swelling polymer immediately and rapidly begins to swell, until it has swollen to several hundred times its weight (about 1300 times in the case of SGP 502S). The pores in the water-rich portions thus become plugged, while pores in the oil-rich portions are not plugged.

Following selective plugging of the formation in the manner described above, oil is recovered from the formation. This may conveniently be done by utilizing a liquid flooding medium in a manner well known in the art. Thus, water or other suitable flooding medium may be injected into the formation through one or more injection wells and pushed through both oil-rich and water-rich portions of the formation toward one or more producing wells. Since the water-rich portions are selectively plugged, the flooding medium will selectively push through the oil-rich portions toward a producing well.

Oil is then produced through the producing well or wells, at enhanced oil/water ratios than would otherwise be obtainable.

Studies were conducted by applicant to determine permeability reduction as a function of salinity and temperature. These studies are reported in the examples which follow.

EXAMPLE I

A glass tube 12 inches long and one inch in diameter was packed with sand. The pore volume was determined to be 50.0 cc, and the permeability to 3% salt water was found to be 73.8 Darcys.

A suspension was prepared comprising 400 mg of SGP 502S in 40 ml. of 25% salt water. The suspension was injected into the sand pack.

The injection was followed by injection of a few milliliters of a salt water buffer, and then by 50 ml. of fresh water. Permeability was then determined to be 0.287 Darcys.

Further injections of water of increasingly higher salinity were then made, and permeability was determined after each such injection.

The column was then placed in an oven, and the temperature was increased with further injections of water of increasing salinity.

Table I shows the effect of increasing salinity and temperature, in Darcys.

TABLE I

| Temp. °F. | Fresh water | 2% salt water | 5% salt water | 7% salt water |
|---|---|---|---|---|
| 75 | 0.285 | 8.16 | 11.4 | 13.2 |
| 100 | 0.576 | 11.8 | 15.0 | 18.0 |
| 125 | 0.935 | 11.0 | 14.0 | 16.5 |
| 150 | 0.802 | 7.48 | 14.2 | 16.7 |

The same data is presented below in Table II, except that the numbers given in Table II represent the percent permeability remaining compared to that obtained with fresh water at 75° F.

TABLE II

| Temp. °F. | Fresh water | 2% salt water | 5% salt water | 7% salt water |
|---|---|---|---|---|
| 75 | 100% | 89.3% | 84.9% | 82.4% |
| 100 | 99.6% | 84.4% | 80.0% | 75.9% |
| 125 | 99.2% | 85.4% | 81.4% | 78.0% |
| 150 | 99.3% | 90.2% | 81.1% | 77.7% |

The figures given in Table II were computed by use of the following formula:

$$\% \text{ at } x° \text{ and } y\% \text{ salinity} = 100 \times \frac{\text{original permeability} - \text{permeability at } x° \text{ and } y\%}{\text{original permeability} - \text{permeability at } 75°, \text{ fresh water}}$$

As is apparent from the above data, good permeability reduction is achieved even in solutions as saline as 7%, especially so long as the temperature remains near ambient. Increasing temperature appears to have much less effect on permeability reduction than increasing salinity.

Based on these studies, applicant concludes that the methods of this invention are most useful when the salinity in the water-rich portions is 7% or less, and when the formation temperature is about 175° F. or less.

Other experiments were performed to determine whether the manner of introduction of the polymer into the sand pack effected the results obtained. Tests were made wherein the SGP polymer was suspended in a viscous solution of hydroxypropyl cellulose in isopropanol. Corresponding tests were made whereby the polymer was introduced in the manner described above. It was concluded from these tests that permeability reduction was not affected by the method of introduction of the polymer.

ADVANTAGES OF THE INVENTION

The primary limiting factor in many oil recovery techniques is cost. Although methods often exist to improve recovery, they may not be useful when evaluated against the value of the oil recovered and other cost factors. Even the most satisfactory prior art approaches to solving the above-mentioned problems are quite expensive when compared to the methods of this invention. In fact, based on costs at the time of this application, the methods disclosed herein (using salt water for the unswollen suspension) are believed by applicant to cost only about 1/12 that of such prior art methods. Thus, the cost savings for similar results may exceed 90% by utilizing the methods disclosed herein.

Apart from the apparent cost and efficiency advantages of the invention, the methods of the invention provide several distinct advantages over those of the prior art. One such advantage is that, unlike some prior art methods, no shut-in time is required. Waterflooding may recommence immediately after treatment if desired.

Further, permeability of the effected water-rich portions may be restored either temporarily or permanently. For temporary restoration, injection of highly saline water may be utilized. For permanent restoration, acidic water or chlorine bleach may be injected.

It will be apparent to those of skill in the art that various changes and modifications may be made in the methods disclosed herein without departing from the scope of the invention, which is defined by the following claims.

What is claimed is:

1. A method for the recovery of oil from a subterranean formation having a formation temperature of no more than about 175° F., and having therein some portions which are relatively oil-rich and other portions which are relatively water-rich, the water in said water-rich portions having an average salinity of no greater than about 7%, comprising:
   providing an oil-soluble swelling polymer which has an affinity for water and which, when contacted by fresh water, will swell to more than 1000 times its weight;
   then preparing an unswollen suspension by suspending said swelling polymer in a suspension liquid that will not cause the swelling polymer to swell significantly;
   injecting said unswollen suspension into said subterranean formation, whereupon said swelling polymer swells in said water-rich portions to at least about 1000 times its normal size thereby obstructing pores in said water-rich portions of the formation;
   pushing oil through said formation by use of a liquid flooding medium; and
   producing oil from said formation.

2. The method in accordance with claim 1, wherein said swelling polymer is a copolymer of starch and an acrylic.

3. The method in accordance with claim 1, wherein said swelling polymer is a copolymer of starch and an acrylamide.

4. The method in accordance with claim 1, wherein said swelling polymer is a copolymer of starch and an acrylate.

5. The method in accordance with claim 1, wherein said suspension liquid is a highly saline water solution.

6. The method in accordance with claim 5, wherein said suspension liquid is a salt water solution having a salt content of approximately 25%.

7. The method in accordance with claim 1, wherein said suspension liquid comprises isopropanol.

8. A method for the recovery of oil comprising:
   selecting a subterranean formation having a temperature of no more than about 175° F. and having therein portions which are relatively rich in oil, and other portions which are relatively rich in water said water having a salinity of no more than about 7%;
   providing one or more injection wells and one or more producing wells into said formation;
   providing an oil-soluble swelling polymer which has an affinity for water and which, when contacted by fresh water, will swell to more than 1000 times its weight;

then preparing an unswollen suspension by suspending said swelling polymer in a suspension liquid that will not cause the swelling polymer to swell significantly;

injecting said unswollen suspension into said subterranean formation, whereupon said swelling polymer swells to at least about 1000 times its normal weight thereby obstructing pores in said water-rich portions of the formation;

injecting a liquid flooding medium into said formation through one or more of said injection wells;

pushing oil from said oil-rich portions of said formation with said flooding medium; and, producing oil from said formation through at least one of said producing wells.

9. The method in accordance with claim 8, wherein said swelling polymer is a copolymer of starch and an acrylic.

10. The method in accordance with claim 9, wherein about 1% by weight of said swelling polymer is utilized.

11. The method in accordance with claim 8, wherein said swelling polymer is a copolymer of starch and an acrylamide.

12. The method in accordance with claim 8, wherein said swelling polymer is a copolymer of starch and an acrylate.

13. The method in accordance with claim 8, wherein said suspension liquid is a highly saline water solution.

14. The method in accordance with claim 13, wherein said suspension liquid is a salt water solution having a salt content of approximately 25%.

15. The method in accordance with claim 8, wherein said suspension liquid comprises isopropanol.

16. The method in accordance with claim 8, wherein said flooding medium is a waterflood.

17. A method for the recovery of oil from a subterranean formation having a formation temperature of no more than about 175° F., as having therein some portions which are relatively oil-rich and other portions which are relatively water-rich, the water in said water-rich portions having an average salinity of no greater than about 7%, comprising:

providing a copolymer of starch and an acrylic which has an affinity for water and which, when contacted by fresh water, will swell to at least about 1300 times its weight;

then preparing an unswollen suspension by suspending less than about 3% by weight of said copolymer in a highly saline solution, having a salt content of at least about 25%;

injecting said unswollen suspension into said subterranean formation, whereupon said swelling polymer swells to at least about 1300 times its normal weight thereby obstructing pores in said waterrich portions of the formation;

pushing oil from the oil-rich portions of said formation by use of a liquid flooding medium; and producing oil from said formation.

* * * * *